Patented Mar. 23, 1948

2,438,418

UNITED STATES PATENT OFFICE 2,438,418

PROCESS FOR THE ISOLATION OF OLEANDRIN

August I. Ryer and Marie Frisch, New York, N. Y., assignors to Schering Corporation, Bloomfield, N. J., a corporation of New Jersey No Drawing. Application June 22, 1945, Serial No. 601,084

9 Claims. (Cl. 260—210)

This invention relates to an improved process for the isolation and recovery of oleandrin from plant material containing the same, and particularly from oleander leaves. Oleandrin is a plant glycoside of known structure (Neumann, Berichte 70, 1547–1554 (1937)) with a digitalis-like action, and is valuable in medicine.

In the prior methods for the isolation of oleandrin great difficulty has been encountered in separating the oleandrin from the other natural materials extracted therewith, with the result that either a rather impure product was obtained, or measures had to be resorted to which caused loss of considerable amounts of the drug and considerably complicated the process of extraction. Thus, by the procedure described in Patents Nos. 2,099,158 and 2,168,789, only a crude, colored, amorphous mixture of glycosides of unknown composition can be obtained. The purification of such impure mixture will present great difficulties and unavoidably involve considerable loss of oleandrin. In German Patent No. 577,257 there is also described a procedure for the isolation of oleandrin which involves a distillation in order to concentrate the solution of the active material in the extraction menstruum in the course of purifying the extract. Such distillation, however, is slow and extremely difficult owing to the excessive foaming of the plant extracts; moreover, the distillation causes loss of oleandrin because of the instability of the glycoside in the hot water-methanol solution employed in such known process.

It is the general object of the present invention to provide an improved process for the purification of oleandrin extracts wherein an efficient separation of the oleandrin from the accompanying impurities is accomplished by a simple procedure which avoids the use of such elevated temperatures as will cause loss of oleandrin and which can be expeditiously and conveniently carried out. It is a further object of the invention to provide a simplified procedure for the isolation of oleandrin whereby crystals of a high degree of purity are obtained in good yield. Other objects of the invention will appear from the following detailed description of the invention.

We have found that the known intermediate purification of oleandrin extracts by the concentration or evaporation of large volumes of solutions of oleandrin in organic solvents can be avoided by subjecting the extracts, preferably after a preliminary purification in known manner with lead acetate, to the action of a suitable adsorbent, whereby a large proportion of the impurities are removed from the extract without any considerable loss of oleandrin. We have found that the usual commercial adsorbing agents have a preferential action on the impurities and that thereby an efficient purification can be attained in a very simple manner. Adsorbents like fuller's earth, diatomaceous earth, alumina, and activated bauxite have been found by us to give very satisfactory results.

In carrying out our invention an aqueous extract of ground oleander leaves, prepared in any known or suitable manner, is preferably first subjected to the known preliminary purification with lead acetate, followed by filtration and treatment of the filtrate with an agent for removing excess lead. The solution is then treated with a suitable quantity of the adsorbent and the so purified solution is then worked up in any desired manner. We prefer to extract the purified solution with a water-immiscible solvent in which the oleandrin is very soluble, like chloroform or methylene chloride. The organic solvent may then be removed by evaporation at reduced pressure and the residue may then be further purified by crystallizing it from volatile organic solvents, preferably a low-boiling alcohol, like methanol or methanol-ether mixtures. Both the precipitate obtained by the lead acetate treatment and the adsorbents with the adsorbed material therein contain small amounts of oleandrin which can be recovered by treatment of the dried solids with hot solvents like chloroform or methanol. These extracts give additional yields of oleandrin on treatment with fuller's earth or other adsorbent.

The following examples illustrate the invention in greater detail but it will be understood that the invention is not restricted to the exact conditions therein described.

*Example I*

3.5 kilos of dried oleander leaves (ground to pass a No. 16 mesh screen) are stirred with 25 liters of tap water for three hours and allowed to stand over night. The mixture is then filtered and pressed, and the leaves again extracted in a similar manner, three more times successively with fifteen liters of 50% methanol, twelve liters of water and twelve liters of 80% methanol. These four extracts are combined, stirred with a solution of 400 g. of lead acetate in two liters of water for two hours, and filtered. The excess lead is removed from the filtrate by treatment with 300 g. of sodium sulphate followed by filtration. The filtrate is stirred with four kilos of fuller's earth for six hours and filtered. The filtrate is then extracted five times with three-liter portions of chloroform. The chloroform extracts are combined and evaporated under reduced pressure leaving behind a viscous oil which becomes crystalline within one week. This residue, amounting to about 20 g., is treated with a mixture of methanol and ether and filtered, giving about 7 g. of a white crystalline material melting at 238–250° C. After several recrystallizations from pure methanol or methanol-water, 4.0 g. of pure oleandrin with the following constants are obtained:

Melting point = 250° C. $[\alpha]_D = -54$ C. (in $CHCl_3$).

Analysis.—Calc. for $C_{32}H_{48}O_9$, C=66.66%, H=8.33%, OCH=5.38%. Found: C=66.50%, H=8.13%, OCH=5.53, 5.72%.

Example II

Two kilos of dried oleander leaves are covered with sixteen liters of water and allowed to stand for twenty-four hours with occasional stirring. The mixture is then dewatered and the extraction repeated in a similar manner three more times successively with eight liters 50% methanol, eight liters water and six liters methanol. The four extracts are combined, 240 g. of lead acetate added, and the whole stirred for three hours and filtered. The filtrate is then stirred with 180 g. sodium sulfate for one hour and filtered. The filtrate is now stirred with one kilo of activated bauxite for six hours, and allowed to stand over night. This is filtered and the filtrate extracted several times with chloroform, the extracts combined, and the chloroform removed under reduced pressure. The viscous oil which remains as residue is treated with methanol and ether until white needle-like crystals of oleandrin appear. These are filtered off. The methanol-ether filtrate is taken to dryness. Further treatment of this residue with methanol and ether gives additional yields of crystals. The crude oleandrin fractions are combined and recrystallized from methanol and yield 2 g. of pure oleandrin.

Example III

One kilo of dried oleander leaves is treated in a continuous percolator for twenty-four hours with seven liters of water. The extract is drained off and the percolation repeated with five liters of methanol. The second extract is drained off and a third extraction repeated with five liters of water. The extracts are combined, treated with lead acetate and the excess lead removed with sodium sulfate. The resulting filtrate is stirred for three hours with one-half kilo of alumina, allowed to stand over night, and filtered. The filtrate is extracted with chloroform and worked up as described in Examples I and II and yields 0.5 g. of crystalline oleandrin.

The oleander leaves, preferably of the species Neriium Oleander, generally give best results if gathered in the fall.

We claim:

1. In a process for the isolation of oleandrin, the steps which comprise subjecting the impure solution of oleandrin to the action of lead acetate, separating the solution from the precipitate, and subjecting the solution to the action of an adsorbent for the remaining impurities and selected from the group consisting of fuller's earth, diatomaceous earth, alumina, and activated bauxite, and separating the purified solution from the adsorbent.

2. In a process for the isolation of oleandrin, the steps which comprise subjecting an impure solution of oleandrin to the action of an adsorbent of the group consisting of fuller's earth, diatomaceous earth, alumina, and activated bauxite, to remove impurities separating the purified solution from the adsorbent, and further treating the solution for the recovery of oleandrin.

3. In a process for the isolation of oleandrin in which oleander leaves are extracted with water, the extract treated with lead acetate, and excess lead thereafter removed, the steps which comprise subjecting the so preliminarily purified extract to the action of an adsorbent for the impurities and selected from the group consisting of fuller's earth, diatomaceous earth, alumina, and activated bauxite, separating the solution from the adsorbent, extracting the solution with a water-immiscible organic solvent in which the oleandrin is very soluble, and evaporating the organic solvent.

4. Process according to claim 3, in which the residue of the evaporation is recrystallized from methanol.

5. Process according to claim 3 wherein the residue of the evaporation is treated with a mixture of methanol and ether and thereafter recrystallized from methanol solution.

6. Process according to claim 1 wherein the purified solution is extracted with chloroform to remove the oleandrin.

7. In a process for the isolation of oleandrin, the steps which comprise subjecting an impure extract of oleandrin to the action of fuller's earth to effect adsorption of impurities thereby, separating the purified extract from the fuller's earth, and recovering the oleandrin from the extract.

8. In a process for the isolation of oleandrin, the steps which comprise subjecting an impure extract of oleandrin to the action of alumina to effect adsorption of impurities thereby, separating the purified extract from the alumina, and recovering the oleandrin from the extract.

9. In a process for the isolation of oleandrin, the steps which comprise subjecting an impure extract of oleandrin to the action of activated bauxite to effect adsorption of impurities thereby, separating the purified extract from the activated bauxite, and recovering the oleandrin from the extract.

AUGUST I. RYER.
MARIE FRISCH.

REFERENCES CITED

The following references are of record in the file of this patent:

FOREIGN PATENTS

| Number | Country | Date |
|---|---|---|
| 255,689 | Great Britain | July 29, 1926 |
| 577,257 | Germany | June 2, 1933 |